US007180895B2

United States Patent
Smith

(10) Patent No.: US 7,180,895 B2
(45) Date of Patent: Feb. 20, 2007

(54) SYSTEM AND METHOD FOR CLASSIFYING NETWORK PACKETS WITH PACKET CONTENT

(75) Inventor: Brian C. Smith, Fort Worth, TX (US)

(73) Assignee: 3Com Corporation, Marlborough, MA (US)

(*) Notice: Subject to any disclaimer, the term of this patent is extended or adjusted under 35 U.S.C. 154(b) by 947 days.

(21) Appl. No.: 10/036,638

(22) Filed: Dec. 31, 2001

(65) Prior Publication Data
US 2003/0123447 A1    Jul. 3, 2003

(51) Int. Cl.
*H04L 12/28* (2006.01)
(52) U.S. Cl. .................. 370/394; 370/412; 713/154
(58) Field of Classification Search ............... 370/394, 370/412, 465, 468, 252; 709/232, 225; 713/154, 713/167, 161, 179; 711/216, 217; 726/13, 726/14, 23, 24
See application file for complete search history.

(56) References Cited

U.S. PATENT DOCUMENTS

| 4,817,080 | A * | 3/1989 | Soha ........................ 370/252 |
| 6,181,699 | B1 * | 1/2001 | Crinion et al. ............... 370/392 |
| 6,381,242 | B1 * | 4/2002 | Maher et al. ............... 370/394 |
| 6,654,389 | B1 * | 11/2003 | Brunheroto et al. ......... 370/535 |
| 6,781,992 | B1 * | 8/2004 | Rana et al. ................. 370/394 |
| 6,785,677 | B1 * | 8/2004 | Fritchman ..................... 707/6 |
| 6,788,682 | B1 * | 9/2004 | Kimmitt ..................... 370/389 |
| 6,850,490 | B1 * | 2/2005 | Woo et al. ................... 370/230 |
| 6,910,134 | B1 * | 6/2005 | Maher et al. ................. 726/24 |
| 2001/0024448 | A1 * | 9/2001 | Takase et al. ............... 370/428 |
| 2002/0015496 | A1 * | 2/2002 | Weaver et al. ............... 380/241 |
| 2004/0199630 | A1 * | 10/2004 | Sarkissian et al. .......... 709/224 |

OTHER PUBLICATIONS

Amaud, Alain; "Deep Packet Classification Coprocessors"; Raqia Networks, Inc., Oct. 25, 2001.

* cited by examiner

Primary Examiner—Chau Nguyen
Assistant Examiner—Jung Park
(74) Attorney, Agent, or Firm—Hamilton & Terrile, LLP

(57) ABSTRACT

Packets are classified by content across a packet flow by sequencing packets according to packet flows through a content engine. A sequencer tracks packet flows, sending and buffering out-of-order packets to have missing packets resent. A regular expression engine determines matches of regular expressions and subexpressions with regular expressions encoded as non-deterministic finite automata with field programmable gate arrays and subexpression matches computed with a hash and determined by a hash look-up table. A tag module establishes a classification tag for a packet based on the packet's content by matching the tag with the regular expression and subexpressions of the packet.

4 Claims, 3 Drawing Sheets

SYSTEM AND METHOD FOR CLASSIFYING NETWORK PACKETS WITH PACKET CONTENT

TECHNICAL FIELD OF THE INVENTION

This invention relates generally to computer networks, and more specifically relates to a system and method for classifying packets based on packet content.

BACKGROUND OF THE INVENTION

Packet-based computer networks transmit information in packets that include header information for routing the packets and packet contents. Packet headers are formatted with a sequence of well known header fields that direct the packets through the network. For instance, network computing devices perform routing and switching functions with packet field values based upon computations using header field values. Routers are an example of a network computing device that rapidly directs packets with computations based on the packet's destination address in the packet IP header field. Modern routers rapidly compute an output interface by performing hard-wired fixed functions rather than relying on slower software functions. Although hard-wired functions perform at greater speeds than software functions, hard-wired functions lack the flexibility of software functions and are difficult to modify or change.

Following the packet header fields are the contents of the packet. The header fields indicate the type of content. For instance, an EtherType field indicates that a packet contains an IP datagram and the packet field values for an IP datagram allow determination of the type of data, such as TCP, UDP, RTP, etc. Typically, the packet contents are not referenced for routing or switching operations through packet based networks since functions performed on packet contents would slow packet transfers through the network. For instance, the Ethernet, IP and TCP layers, known as layers 2, 3 and 4 respectively are used but deeper layers are not. However, packet header fields do sometimes indicate that the contents of a flow of packets are related by providing ordered sequencing information that relates packets within a network flow. For instance, one type of network packet flow is a TCP stream which includes header fields indicating the TCP sequence order of packets. With network packet flows having an ordered sequence of packets identified with sequencing information in the packet header field, the destination device is able to reassemble the contents and determine if packets are missing from the stream so that the missing packets may be resent.

In order to provide services to packet based networks, network processors have been developed to include programmable functions for classifying, modifying and shaping packets at network line speeds. These network processors include specialized hardware to provide rapid processing of packet header field information in a programmable manner so that packet based networks may provide services without substantial impact on data transfer rates. However, classification of packets based on deep layers of header fields and actual packet content presents a difficult problem since in-depth review of packet contents requires greater processing and tends to slow packet transfer rates through the network.

To address content based classification, application specific processors are available to aid network processor functionality. For instance, Raquia Networks, Inc. sells classification co-processors that classify packets using regular expressions and subexpressions for packet content payload. By supporting network processor functionality with function specific hardware that classifies based on content, content classification of packets is possible at line speeds. However, integration of content classification into a packet based network remains a complex problem, particularly when processing streams of packet content.

One difficulty with classifying packets by content is that packet content typically spans more than one packet of a packet flow. Thus, packet content searches that span only a single packet may miss desired content sent in two or more different packets of a stream. Further, packets of a stream are sometimes sent out of order so that content classification cannot be completed absent the missing packet or packets.

Another difficulty with content classification is that the process of searching packet contents risks slowing network traffic to an unacceptable level. This problem becomes particularly acute where the content search is complex, involving multiple expressions and subexpressions. Further, to the extent that current systems are able to classify based on content, such systems lack scalability. For instance, the systems available from Raqia Networks, Inc. are able to search for expressions numbered in the thousands but millions of expressions are required to effectively classify on content, such as for blocking access to pornography sites.

SUMMARY OF THE INVENTION

Therefore a need has arisen for a system and method which simplifies classification of packets based on packet content.

A further need has arisen for a system and method which classifies packets based on content for a network packet flow.

In accordance with the present invention, a system and method is provided that substantially eliminates or reduces disadvantages and problems associated with previously developed systems and methods for content classification of packets transferred across a packet based network. A sequencer cooperates with a content engine to perform packet content searches across network flows to classify packets by content. In one embodiment, a hash engine aids classification of packets with subexpressions by computing a hash based on subexpression matches for predetermined strings. A tag map uses the output of the content engine to establish or modify a packet classification tag and forward the packet with the content classification tag for transmission to the network.

More specifically, the sequencer receives packets with an enqueue engine that determines the packets' stream identification and whether the packet is out of order. If a packet is out of order, the enqueue engine sends the packet to a bypass so that the packet is transmitted to the network and the client can have the missing packet resent. The out-of-order packet is marked as sent and buffered so that the missing packet may be received and its content processed as part of the stream. The sequencer is thus able to hold the out-of-order packet until the missing packet is received, times out or the buffer space is needed for another stream.

The enqueue engine updates a data structure called a stream tracker as packets arrive so that the stream tracker can track packets in a list identified by a stream identifier. A dequeue engine forwards packets to a content classification engine in sequence so that packet contents are searched for classification and then updates the stream tracker to indicate that the packet has been processed. The content classification engine requests a packet by providing the stream identification of the last packet processed. The dequeue engine provides the classification engine with the next packet associated with that stream identification if the next packet is ready or otherwise provides a packet from the next priority stream.

The content classification engine is a regular expression engine that searches for regular expression matches with non-deterministic finite automata encoded with field programmable gate arrays. The regular expression engine receives characters of the packet from a lexical analyzer and proceeds through states to find a match when a final state is reached. Possible subexpression matches are determined if certain states are found in the regular expression engine and the possible subexpression match is noted for one or more hash engines, with a hash engine for each subexpression. The hash engine computes a hash for the subexpression and looks-up the computed hash in a hash look-up table to determine if a subexpression string match exists. High bits of the hash are used as an index of the hash table to provide a more rapid comparison.

A tag map determines a classification tag for the packet based on the results of the packet's content search. The tag map uses a prioritized comparison of the packet's original tag, its regular expression match and its subexpression string match to determine a modified tag. The packet is then transmitted to the network or a network processor with the tag providing the packet's classification.

The present invention provides a number of important technical advantages. One important technical advantage is that packet content may be classified across packet flows. The sequencer provides packets with stream identification so that the state of the content engine may be saved to allow a search across multiple packets. Further, the sequencer determines if packets are out of order and buffers packets so that missing packets may be received and processed in order by the content engine.

Another important technical advantage is that content searches are performed in a timely manner. The regular expression engine encodes non-deterministic finite automata with field programmable gate arrays to rapidly process packet characters identified by the lexical analyzer to determine if a regular expression match exists. The regular expression engine progresses through states so that progress to a predetermined state identifies possible subexpression matches that are confirmed by a regular expression match. Identification of a possible subexpression match allows computation of a hash to proceed so that, if a regular expression match is confirmed, the computed hash is available in a rapid manner to determine if a string match exists between the hash and a hash look-up table. The hash look-up table indexes the computed hash by high bits to more rapidly determine a string match with a low probability of error.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numerals being used to refer to like and corresponding parts of the various drawings.

Content classification allows services to be deployed to packet-based networks based on the content of the packets transmitted over the network. Thus, packets and packet flows may be routed, shaped, modified, queued or dropped based upon the content of the packet as opposed to just using the header fields. However, searching packet content presents a significant challenge since an in-depth review of packet content typically slows packet flow rates, potentially impacting network performance.

Figure 1:
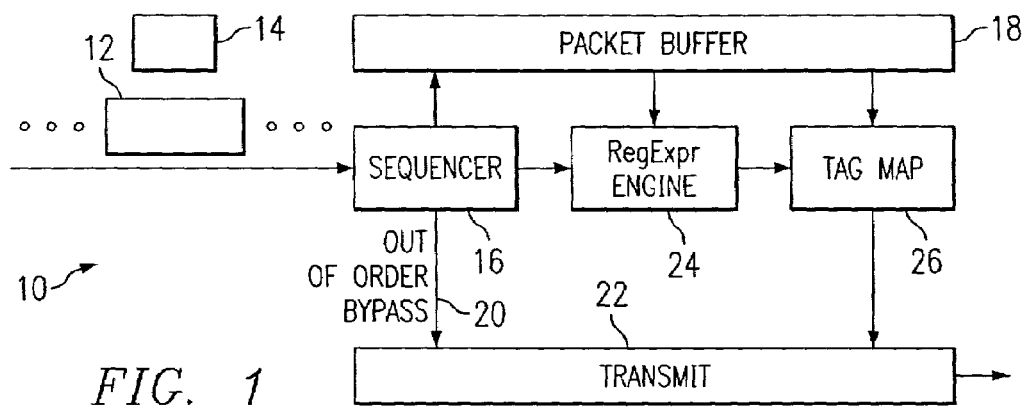
FIG. 1 depicts a block diagram of a system for classification of packets based on content.

Referring now to FIG. 1, a block diagram depicts a packet content classifier 10 that classifies individual packets and packet flows based on packet content. In one embodiment, line speed packet content classification is achieved by using field programmable gate arrays (FPGA) to perform content searches on individual network packets and network flows, including regular expression and string matching searches.

Packets 12 enter content classification system 10 with optional tag information 14 at a sequencer 16. Sequencer 16 receives packet 12, sorts packet 12 based on the sequence of the packet within a packet flow, such as the sequence number in a TCP stream, and stores the packets in packet buffer 18. Sequencer 16 manages packet flows that arrive out-of-order with special handling. Packets that arrive out-of-order are buffered to allow matching and classification with the packet flow once missing packets are received at sequencer 16. To ensure that missing packets are retransmitted, sequencer 16 sends packets that are out-of-order through an out-of-order bypass 20 to a transmit module 22. Transmit module 22 forwards the out-of-order packets to the client so that the client can request the sending server to retransmit the missing packet. Out-of-order packets that are sent through bypass 20 are also stored in packet buffer 18 for matching when the retransmitted packet arrives, and are flagged as having been "sent" to avoid repeated transmission to the client after matching.

A regular expression engine 24 operating in a separate thread of control requests packets from sequencer 16 for content classification. Regular expression engine 24 processes the packet with regular expressions, a common way of representing patterns, including searches across packet boundaries in a packet flow. In addition, the regular expression engine 24 performs string searches, such as through a hash look-up, to determine the presence of subexpressions. Once regular expression engine 24 processes the packets, it passes the packets to tag map 26 which modifies the packet's tag based on the results of the processing by regular expression engine 24. Tag map 26 sends packets with modified tags to transmit module 22, unless the packet was already sent by sequencer 16, which transmits the packets through the network.

Figure 2:
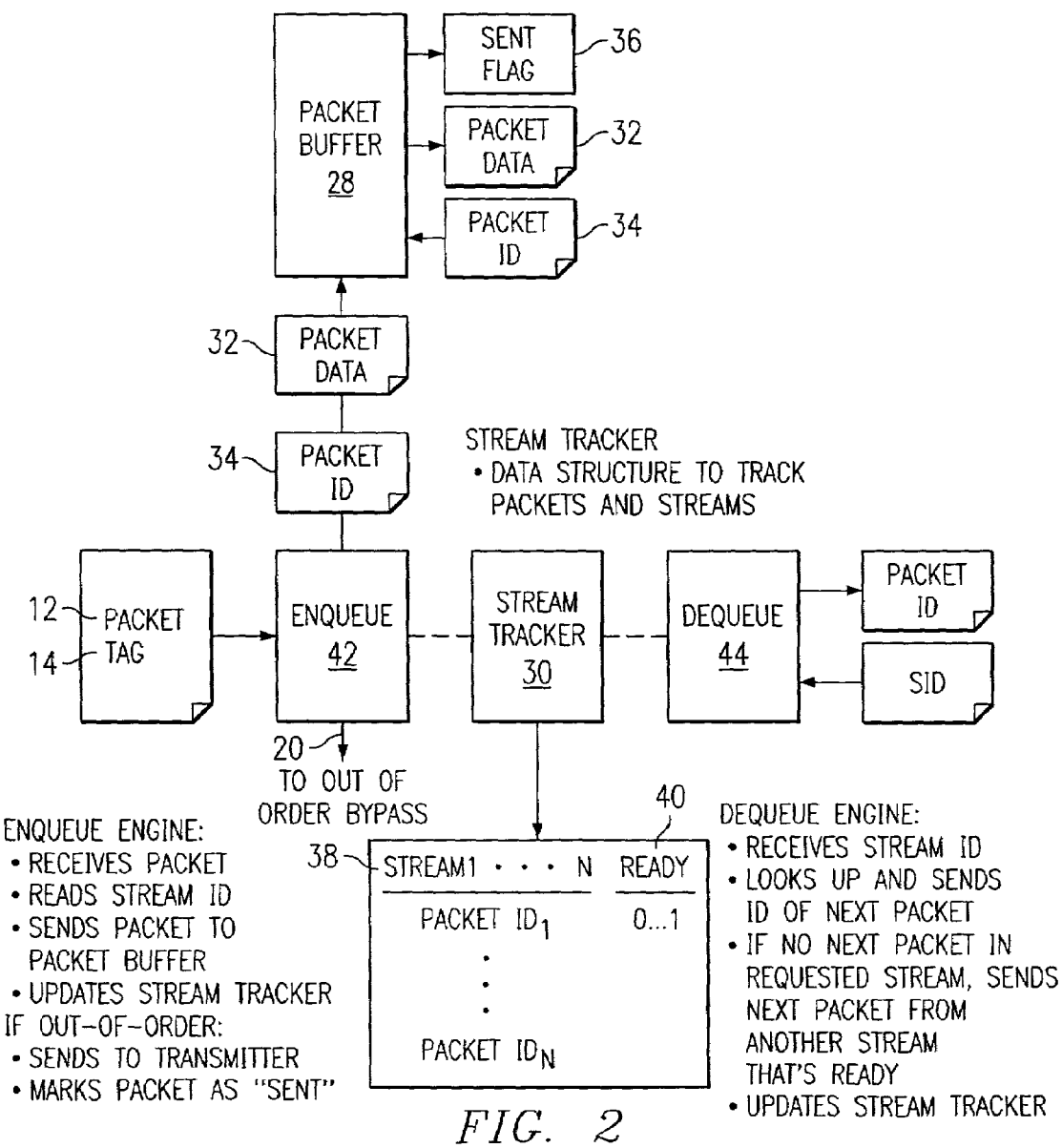
FIG. 2 depicts a block diagram of a sequencer for classification across a packet flow.

Referring now to FIG. 2, a block diagram depicts sequencer 16 for collating TCP packets which are part of one or more TCP stream packet flows. The TCP stream associated with a TCP packet is determined with the source\destination host\port quadruple in each packet's header, a 96-bit value called the stream identifier. Sequencer 16 determines if a packet has arrived out-of-order within that packet's TCP stream by using the TCP sequence number in the packet's header. Note that, in addition to TCP streams, other types of packet flows such as RTP flows have similar sequencing information in their header fields and thus may be processed by sequencer 16 in a manner similar to TCP streams.

Sequencer 16 applies a packet buffer data structure 28 and a stream tracker data structure 30 that cooperate to bring packet streams to regular expression engine 24 for content classification. Packet buffer data structure 28 is a module that accesses external memory for storing packet data 32 indexed by packet identifier 34. Packet identifier 34 is a unique identifier associated with each packet and generated when each packet arrives. Based on packet identifier 34, packet buffer data structure 28 sets and retrieves packet data 32 and also supports deletion of packet data, such as automatic deletion of oldest packet data if no free space is available. Packet buffer data structure 28 also stores a sent flag 36 associated with each packet to indicate whether the packet has already been transmitted, such as for out-of-order packets that are transmitted to get the receiving client to request retransmission of missing packets.

Stream tracker data structure 30 tracks packet flows by maintaining an ordered list of packet IDs for each TCP stream. Each stream list 38 includes packet IDs and stream order determined by TCP sequencing information and so has an associated ready indicator 40 to indicate whether the stream is ready for forwarding to regular expression engine 24. Ready indicator 40 is a Boolean value that is true when the next packet in the TCP sequence for the stream list of packet IDs has been received. In other words, ready indicator 40 is true when there is no missing packet preceding a stream. If a packet is missing, the Boolean value is false. In addition to processing TCP packet streams, other packet flows that contain sequencing information are handled in a similar manner, with packets stored in order and indexed by an appropriate packet flow identifier as long as the packet flow is available from sequencing information determined through packet inspection.

Sequencer 16 determines when a stream is terminated and, upon termination, releases memory allocated for the stream. For instance, when a TCP packet is received for a stream with the FIN bit set, stream tracker 30 determines the stream is cleanly terminated. For packets without sequencing information, such as DNS requests, stream tracker 30 creates a special stream, such as a first-in first-out queue, associated with an identifier, such as all zeros, to indicate that the packet is not part of a sequenced stream. The ready indicator for non-sequenced packets is always true if a packet is in the first-in first-out queue. If stream tracker 30 needs free space for new streams, the least recently used stream is automatically deleted.

Packet 12 and tag 14 are received at sequencer 16 through enqueue engine 42, which updates packet buffer 28 and stream tracker 30 accordingly. Enqueue engine 42 reads the stream identification of the packet and assigns packet identification 34. Enqueue engine 42 provides stream tracker 30 with stream identification information to allow stream tracker 30 to maintain an ordered list of packet identifications for each stream. If the sequencing information in stream tracker 30 indicates that the packet has arrived out-of-order, the packet is sent to bypass 20 for transmission by transmit module 22 and enqueue engine 42 marks the packet sent flag 36 to indicate the packet has been sent.

A dequeue engine 44 handles requests for packets from regular expression engine 24. Regular expression engine 24 sends the stream identifier of the last processed packet to dequeue engine 44 when the regular expression engine 24 is prepared to accept another packet for processing. Dequeue engine 44 finds the stream with a ready indicator that has been true for the longest period and sends the next packet in the ordered sequence for that stream to regular expression engine 24. The packet ID 34 for the packet is sent to regular expression engine 24 to allow regular expression engine 24 to obtain the packet data 32 from packet buffer data structure 28. Stream tracker 30 is updated by dequeue engine 44 when a packet is forwarded to regular expression engine 24 for processing. For instance, the packet is deleted from stream tracker 30's packet list and the ready indicator is set to false if the next packet in the list is not available. Dequeue engine 44 sends the next packet from the stream of the stream identifier provided by regular expression engine 24 if the next packet in this sequence is available. If no packet from that stream is available, then the next priority stream, such as the oldest ready stream, is used.

Figure 3:
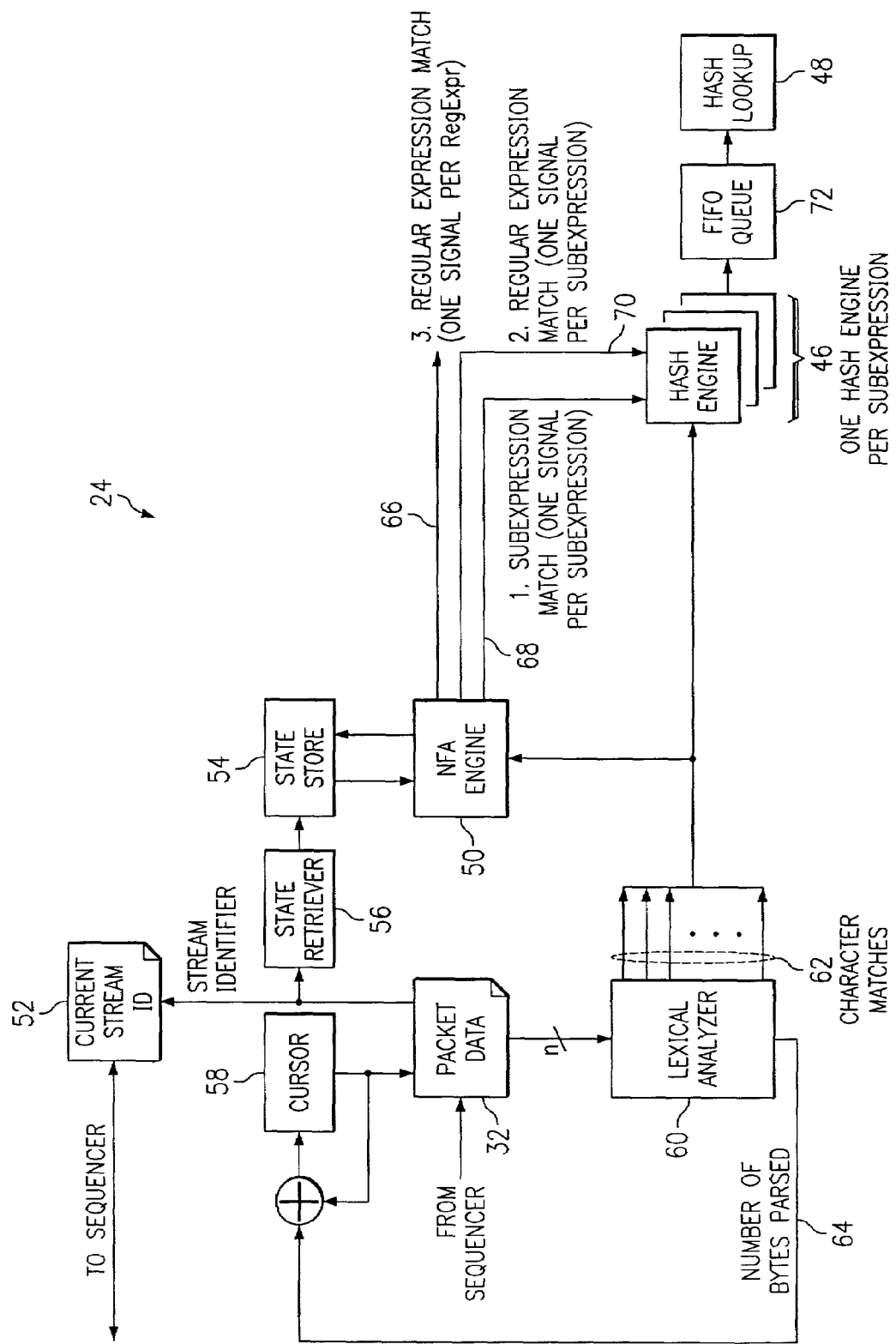
FIG. 3 depicts a block diagram of a regular expression engine.

Referring now to FIG. 3, a block diagram depicts regular expression engine 24 which determines packet content by searching packets or packet flows for sequences that match regular expressions. Regular expression engine 24 searches packet payloads, meaning everything in the packet that is not in the header, for matches of one or more regular expressions programmed into the content classification system 10. By coordinating with stream tracker 30, regular expression engine 24 detects matches that span multiple packets.

In addition to searching for sequences that match regular expressions, regular expression engine 24 performs string searches to match subexpressions. A subexpression is a portion of a regular expression delimited by parentheses. For example, in the regular expression "ABC*([EF]*)G", the string "[EF]" is a subexpression which is given a unique identifier called a subexpression ID. To perform string searches for subexpressions, regular expression engine 24 uses a hash engine 46 that compares matching sequences for subexpressions against strings in a hash look-up database 48.

Hash engine 46 provides a highly scalable method for locating specific strings in specific contexts with a hash engine used for each subexpression. Regular expressions set the context for the location of specific strings, thus allowing content specific functions to be performed on packets and packet flows. For instance, a regular expression match for all HTTP GET requests with the URL portion of the get request marked as a subexpression provides an implementation for a web filtering function based on packet contents. A packet containing an HTTP GET request with a URL in the hash look-up string data base may be identified and tagged for specific treatment, such as for dropping of filtered content. Using a hash engine and hash look-up table provides a scalable solution that uses small amounts of memory per string regardless of string length. This is because the hash search is probabilistic yet reliable with only rare occurrences of a false positive match. For instance, the probability of a false positive is $S/2^n$ where S is the number of strings in the database and n is the number of bits in the hash. For a hash of 72 bits and a database with four million strings, the probability of a false positive is 1 in $2^{50}$, a very small probability of slightly less than one in a quadrillion.

FIG. 3 depicts the structure of regular expression engine 23 with a hash engine 46 created for each subexpression. An NFA engine 50 encodes regular expressions as nondeterministic finite automata (NFA), which can be directly implemented using field programmable gate arrays (FPGA). Thus, a hash engine 46 is created for each subexpression encoded in the NFA engine 50 as part of a regular expression. In one embodiment, NFA engine 50 is provided through processors available by Raqia Networks, Inc.

Content based processing in regular expression engine 24 proceeds in two phases, an initialization phase and a search phase. In the initialization phase, a current stream ID module 52 requests packets from sequencer 16 by sending the current stream identification. The stream identifier of the packet provided in response to the current stream ID determines whether NFA engine 50 uses its existing state or is initialized from a stored state or default state. If the packet provided by sequencer 16 has the same stream ID as the current stream, NFA engine 50 uses its current state, unless the stream ID is that of a special unordered stream, such as all zeros, in which case a default state is set.

A state store module 54 loads and saves the state of all flip-flops in the NFA engine 50. The stream identifier of the packet provided from sequencer 16 determines whether NFA engine 50 continues to use current state information or saves current state information and downloads saved state information. For instance, if the stream identifier of the packet received from sequencer 16 is the same as the current stream identifier, NFA engine 50 processes the incoming packet with current state information. If the stream identifier of the packet received from sequencer 16 is different from the current stream identifier, state retriever 56 extracts the new stream identifier and provides the stream identifier to state store module 54. State store 54 saves the current NFA state from NFA engine 50 and loads the NFA state associated with the new stream. State retriever 56 also computes the offset of the packet payload and initializes a cursor register 58 with the value of the offset. If a packet provided from sequencer 16 is not a TCP packet or part of a packet flow, state retriever 56 resets NFA engine 50 to a default state such as by providing all zeros to state store module 54 as the stream identifier, and also sets the cursor register 58 to the beginning of the packet.

Once NFA engine 50 is initialized to the state of the packet being received from sequencer 16, then the search phase begins with a search for matches to regular expressions, subexpressions and hash searches. A lexical analyzer 60 examines each character in the packet's payload and sends the results of this analysis to NFA engine 50 and hash engines 46. Lexical analyzer 60 retrieves bytes from packet 32 starting at the location in the payload specified by cursor register 58. Lexical analyzer 60 compares each character against all ASCII and character classes, such as white space, alphabetic, alphanumeric, or digits, with the comparison results used to set values for character match lines 62. Each character match line 62 corresponds to an ASCII character or character class and provides the match information to NFA engine 50 and hash engines 46. Lexical analyzer 60 may detect multiple character encoding of ASCII characters encoded in multiple bytes by computing the number of bytes in the multiple character encoding and feeding back this value through number of bytes parsed line 64 to cursor register 58 to advance to the next character in the packet.

Figure 4:
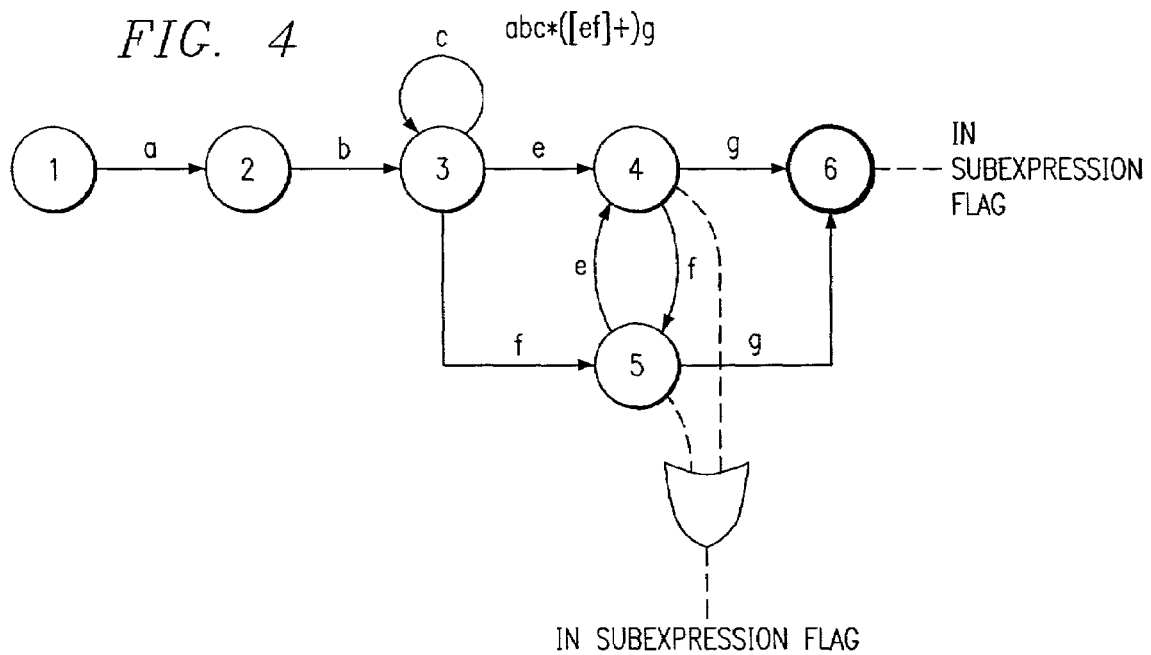
FIG. 4 depicts a state diagram for a nondeterministic finite automata.

NFA engine 50 uses character matches from character match lines 62 of lexical analyzer 60 to advance through a sequence of states in a process of searching for regular expression matches. In addition, each change of state in NFA engine 50 indicates a possible subexpression match. For example, referring to FIG. 4, a state diagram depicts changes in state for an NFA associated with a regular expression of A B C E F G having a subexpression of "[E F]". Thus, whenever the NFA advances to states 4 or 5, a subexpression match is possible and an advance to state 6 confirms a regular expression match as well as the subexpression match. Upon identifying a regular expression match, NFA engine signals the regular expression match through line 66.

Possible subexpression matches are signaled from NFA engine 50 to hash engines 46 through line 68. Hash engines 46 compute a hash based on values output by lexical analyzer 60. Each hash engine computes a hash of contiguous sequence of characters that match the hash engines corresponding subexpression with the size of the computed hash based on the number of strings in hash look-up data base 48. For instance, the number of bits in a hash is $16+\log_2$ (DB size) rounded to the next integer value where DB size is the number of strings in the hash look-up data base 48. A DB size of one million has a hash of 36 bits. In other embodiments, the hash may be longer.

Figure 5:
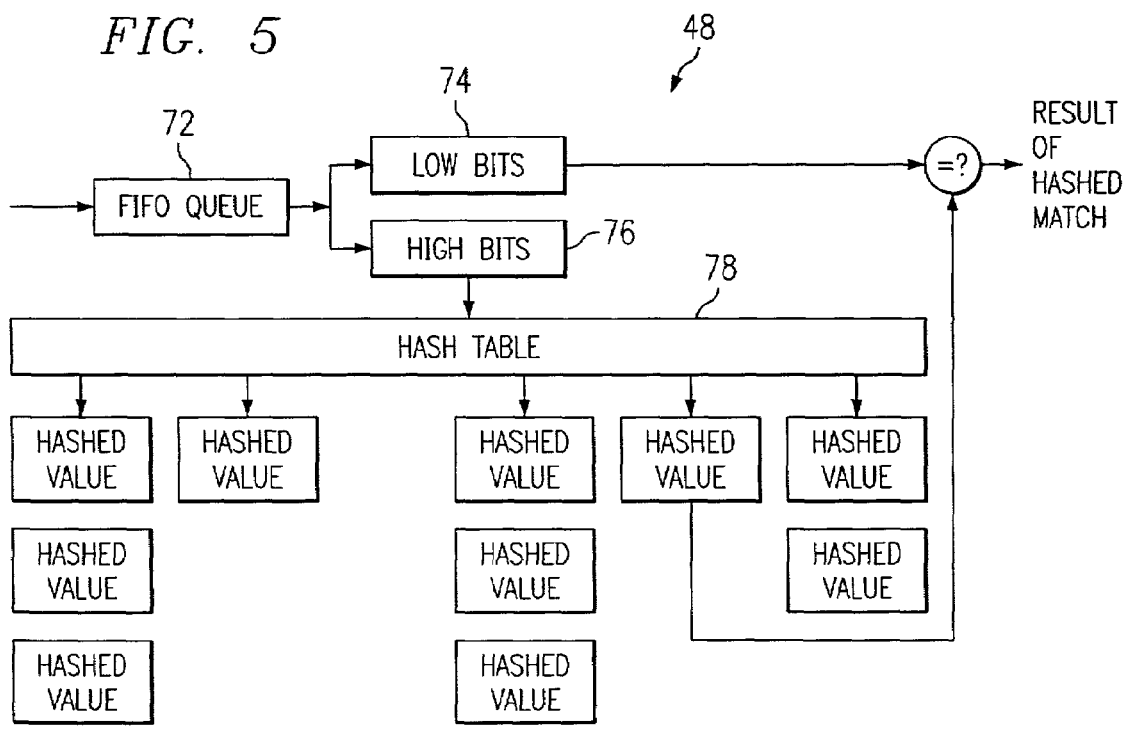
FIG. 5 depicts a hash table look-up.

If NFA engine 50 confirms a regular expression match by entering the final state, then a confirmation signal is sent by line 70 to indicate to hash engine 46 that the regular expression contained the subexpression for the computed hash. Hash engine 46 then places the hash value in a first-in first-out queue 72 for examination by hash look-up table 48. Hash look-up table 48 determines whether the computed hash matches any string in the data base to determine a classification for the packet. For instance, if the regular expression is an HTTP GET, hash look-up table 48 determines if a URL subexpression for the HTTP GET matches a hash for a predetermined URL and classifies the URL with an associated classification tag, such as one that leads to dropping of the packet and packets of that TCP stream.

e;2qReferring now to FIG. 5, a block diagram depicts the table look-up performed by hash look-up module 48. Hash look-up module 48 retrieves values from FIFO queue 72 and compares the computed hash against those in its string database to determine any matches. The hash value is divided into high and low bits to accelerate the match comparison. A high bits module 76 accepts the high bits of the hash value and uses the high bits as an index into hash table 78. A low bits module 74 compares the low bit hash values against values stored in hash table 78 that correspond to the entries indexed by the high bits module 76 initialized based on values in the string database. For example, with a 36 bit hash, 20 high bits and 16 low bits may be used. The 20 high bits are used as an index into hash table 78 with 220 or approximately 1 million entries. In a database with 1 million strings, the average entry will have one 16 bit hashed value, making the probability of a false match of 1 in $2^{16}$ or about 1 in 65,000. As the hash length increases, this probability can be made arbitrarily small. The number of high bits versus low bits may vary to optimize search speed.

Referring again to FIG. 1, tag map 26 uses the output of regular expression engine 24 to modify tag 14 of packet 12 to reflect classification of packet 12 based on its content. Regular expression engine 24 outputs identifiers of the regular expression matched by NFA engine 50 and identifiers of any subexpression matches determined by hash engine 46 and hash look-up table 48. Tag map 26 uses a prioritized look-up table to perform mapping between expression and sub-expression matches to tags and modified tags. For instance, an example of a tag map is:

| Current Tag | Reg. Exp. ID | String Range | Modified Tag |
|---|---|---|---|
| 17 | 2 | * | 18 |
| * | 3 | 217–250 | 19 |
| * | 4 | * | 21 |
| * | * | 251–251 | 20 |

The current tag column indicates the value of tag 14 associated with packet 12. The regular expression ID column is the identifier of the regular expression match found by NFA engine 50. The string range column is the range of string identifiers found by the subexpression hash match. Each of these three columns may include wildcards that match any value. The modified tag column is the value of the modified tag for packets that map into the first three columns with the tag map table searched in order and the modified tag used from the first matching row.

Using the above table as an example, a modified tag is determined by finding the first row with tag, expression and subexpression values of the table. A packet with a tag of 17 that matches regular expression ID 3 and 4 and matches hash strings 251 and 223 is assigned a modified tag of 19 from the second row. Although the current tag, regular expression and subexpression values of the packet also match rows 3 and 4, row 2 is selected with modified tag 19 as the first row matched.

Once tag map 26 assigns a modified tag if appropriate, the packet proceeds to transmit module 22 for transmission with the modified tag. The modified tag classifies the packet according to packet content so that subsequent handling of the packet may occur. For instance, a network processor may use the modified tag to shape, modify or route the packet. If, for example, the packet content includes a HTTP GET with an unallowed URL, the modified tag instructs a subsequent network processor to drop the packet.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method of claim for classifying packets based on content, the method comprising:
   identifying packet flows, said packet flows comprising a TCP stream;
   determining if a packet is out of order;
   transmitting the out of order packet to its client to have missing packets resent;
   buffering the out-of-order packet until the missing packet is received;
   making the packet flow associated with the missing packet available for content searching;
   searching packet content across the identified packet flows to find one or more predetermined regular expressions;
   computing a hash for predetermined strings of the regular expressions to find one or more subexpressions; and
   using a tag map to:
      perform a mapping between said regular expressions and said subexpressions; and
      generate a modified tag corresponding to matches between predetermined expressions and subexpressions; and
   tagging packets with said modified tags.

2. A system for sequencing packet streams for content classification, the system comprising:
   an enqueue engine that receives the streams and reads the stream identification of stream packets to determine if a packet is out of order;
   a stream tracker interfaced with the enqueue engine that associates packets to streams based upon the stream identification read by the enqueue engine;
   a dequeue engine interfaced with the stream tracker and operable to forward packets for classification based on the packets' stream identification; and
   a packet buffer interfaced with the enqueue engine for storing packets, wherein the enqueue engine is operable to:
      transmit an out-of-order packet so that missing packets can be resent;
      mark the out-of-order packet as sent; and
      buffer the out-of-order packet.

3. The system of claim 2 wherein the dequeue engine is further operable to receive a stream identification, forward the next packet of the stream associated with the stream identification if the stream tracker indicates the next packet is ready, and forward the next packet of a second stream if the next packet of the associated stream is not ready.

4. The system of claim 3 wherein the dequeue engine updates the stream tracker to indicate when a packet is forwarded for classification.

* * * * *